United States Patent
Kuang

(10) Patent No.: US 10,228,453 B2
(45) Date of Patent: Mar. 12, 2019

(54) INDOOR POSITIONING METHOD AND DEVICE

(71) Applicant: HUAWEI TECHNOLOGIES CO., LTD., Shenzhen, Guangdong (CN)

(72) Inventor: Yunsheng Kuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/775,437

(22) PCT Filed: Nov. 13, 2015

(86) PCT No.: PCT/CN2015/094585
§ 371 (c)(1),
(2) Date: May 11, 2018

(87) PCT Pub. No.: WO2017/079975
PCT Pub. Date: May 18, 2017

(65) Prior Publication Data
US 2018/0348351 A1    Dec. 6, 2018

(51) Int. Cl.
*H04W 24/00*    (2009.01)
*G01S 11/06*    (2006.01)
(Continued)

(52) U.S. Cl.
CPC ............ *G01S 11/06* (2013.01); *G01S 5/0252* (2013.01); *G01S 5/0263* (2013.01);
(Continued)

(58) Field of Classification Search
CPC ...... G01S 11/06; G01S 5/0263; G01S 5/0252; H04W 4/33; H04W 4/027; H04W 64/003
(Continued)

(56) References Cited

U.S. PATENT DOCUMENTS

| | | |
|---|---|---|
| 9,125,019 B1 | 9/2015 | Heikkila et al. |
| 2009/0286549 A1 | 11/2009 | Canon et al. |

(Continued)

FOREIGN PATENT DOCUMENTS

| | | |
|---|---|---|
| CN | 102066969 A | 5/2011 |
| CN | 103957505 A | 7/2014 |

(Continued)

OTHER PUBLICATIONS

International Search Report issued in International Application No. PCT/CN2015/094585 dated Jul. 22, 2016, 6 pages.
Extended European Search Report issued in European Application No. 15908105.8 dated Sep. 25, 2018, 12 pages.

*Primary Examiner* — Marcos Batista
(74) *Attorney, Agent, or Firm* — Fish & Richardson P.C.

(57) ABSTRACT

An indoor positioning method includes: obtaining, by a terminal, all predicted locations of a current location, predicting, according to historical movement information of the terminal, a first probability that the terminal passes through each predicted location at a next moment, and obtaining, based on strength of a received signal, a second probability that the terminal passes through each predicted location at the next moment; and generating a corresponding third probability according to the first probability and the second probability that are corresponding to each predicted location, and determining a predicted location point with a highest third probability as a location of the terminal at a second moment.

20 Claims, 6 Drawing Sheets

(51) Int. Cl.
*G01S 5/02* (2010.01)
*H04W 4/02* (2018.01)
*H04W 64/00* (2009.01)
*H04W 4/33* (2018.01)

(52) U.S. Cl.
CPC ............ *H04W 4/027* (2013.01); *H04W 4/33* (2018.02); *H04W 64/003* (2013.01)

(58) Field of Classification Search
USPC .............................. 455/456.1–456.3; 370/338
See application file for complete search history.

(56) References Cited

U.S. PATENT DOCUMENTS

| | | | |
|---|---|---|---|
| 2012/0129546 | A1 | 5/2012 | Yang et al. |
| 2013/0178230 | A1 | 7/2013 | Marti et al. |
| 2013/0300607 | A1 | 11/2013 | Mansour et al. |
| 2014/0200036 | A1 | 7/2014 | Egner et al. |
| 2015/0271632 | A1* | 9/2015 | Venkatraman .......... H04W 4/02 455/456.2 |
| 2016/0154083 | A1* | 6/2016 | Amizur ................. H04W 4/029 455/456.1 |

FOREIGN PATENT DOCUMENTS

| | | |
|---|---|---|
| CN | 104333903 A | 2/2015 |
| EP | 1739879 A1 | 1/2007 |

\* cited by examiner

INDOOR POSITIONING METHOD AND DEVICE

CROSS REFERENCE TO RELATED APPLICARTIONS

This application is a national stage of International Application No. PCT/CN2015/094585, filed on Nov. 13, 2015, which is hereby incorporated by reference in its entirety.

TECHNICAL FIELD

Embodiments of the present invention relate to positioning technologies, and in particular, to an indoor positioning method and device.

BACKGROUND

In a modern city, residents spend an average of 70% of time indoors every day. Therefore, there is a great demand for functions such as positioning in an indoor environment and navigation, people search, and object search that are derived from the positioning. When arriving at the ground, a satellite signal is relatively weak and cannot penetrate a building. Consequently, the existing GPS (Global Positioning System, Global Positioning System) cannot be directly used for positioning in an indoor environment. Basically, a wireless communication manner such as a Bluetooth beacon based, a Wi-Fi (Wireless Fidelity, Wireless Fidelity) AP (Access Point, access point) based, or a macro base station based positioning technology is used for current indoor positioning. For the Bluetooth beacon based and Wi-Fi AP based positioning technologies, a terminal side implements positioning on the terminal. For the macro base station based positioning technology, a network side server performs positioning on a terminal connected to a network.

From a perspective of an implementation means, an RSSI (Received Signal Strength Indicator, received signal strength indicator) based positioning technology is mostly used in the existing Bluetooth beacon based and Wi-Fi AP based indoor positioning technologies.

The RSSI based positioning technology is implemented according to an energy attenuation model of an electromagnetic wave that is being propagated in free space. A negative correlation relationship exists between receive strength of a signal and a propagation distance of the signal. That is, the receive strength of the signal attenuates with an increase in the propagation distance. A shorter distance between a receiver and a sender leads to higher strength of a signal received by the receiver; and a longer distance between the receiver and the sender leads to lower strength of a signal received by the receiver. The distance between the receiver and the sender may be estimated according to the receive strength of the signal received by the receiver and a known wireless signal attenuation model; and a location of the sender or the receiver may be calculated according to multiple estimated distance values.

The RSSI based positioning technology has low positioning accuracy because of two main aspects: On the one hand, the receive strength of the signal is a time-based variable. That is, when the distance between the receiver and the sender remains unchanged, the receive strength of the signal obtained by the receiver varies with time. Furthermore, large quantities of interference factors exist in an actual environment. Consequently, the simple negative correlation relationship between the receive strength of the signal and the propagation distance of the signal becomes more unreliable, and a unique location of the terminal cannot be accurately determined according to the strength of the received signal. On the other hand, large quantities of interference factors, such as a body block, traffic, and movement of a mobile object, affect the receive strength of the signal. Because of impact of these unstable interference factors, even though a user stands at a same location, the receive strength of the signal obtained by the terminal is greatly different due to factors such as a different body direction and population density. Consequently, the unique location of the terminal cannot be determined according to the strength of the received signal.

In conclusion, the RSSI based positioning technology in the prior art has relatively low positioning accuracy because of an uncertain positioning result caused by ranging and positioning based only on the strength of the received signal.

SUMMARY

Embodiments of the present invention provide an indoor positioning method and device, to resolve a problem of relatively low positioning accuracy in an RSSI based positioning technology.

Specific technical solutions provided in the embodiments of the present invention are as follows:

According to a first aspect, an indoor positioning method is provided, including:

obtaining, by a terminal, a first location of the terminal at a first moment;

obtaining, by the terminal, all predicted locations corresponding to the first location, where all the predicted locations include at least two predicted locations;

obtaining, by the terminal according to historical movement information of the terminal, a first probability corresponding to each predicted location, where a first probability corresponding to a first predicted location is a probability obtained according to the historical movement information of the terminal by predicting that the terminal is located at the first predicted location at a second moment, the first predicted location is any one of all the predicted locations, and the second moment is later than the first moment;

obtaining, by the terminal, signal strength of at least one wireless signal received by the terminal at the second moment;

obtaining, by the terminal according to the signal strength of the at least one wireless signal, a second probability corresponding to each predicted location; where a second probability corresponding to the first predicted location is a probability that is obtained according to the signal strength of the at least one wireless signal and that indicates that the terminal is located at the first predicted location at the second moment;

obtaining, by the terminal according to the first probability and the second probability that are corresponding to each predicted location, a third probability corresponding to each predicted location; and determining, by the terminal, a predicted location with a highest third probability in all the predicted locations as a second location of the terminal at the second moment.

With reference to the first aspect, in a first possible implementation of the first aspect, the obtaining, by the terminal, all predicted locations corresponding to the first location includes:

obtaining, by the terminal, a type of a geographical region in which the first location is located; and obtaining, by the terminal according to the type of the geographical region in which the first location is located, all the predicted locations corresponding to the first location; or obtaining, by the terminal, a type of a geographical region in which the first location is located and a historical movement speed of the terminal; and obtaining, by the terminal according to the type of the geographical region in which the first location is located and the historical movement speed of the terminal, all the predicted locations corresponding to the first location.

Herein, all the predicted locations corresponding to the first location are obtained according to the type of the geographical region in which the first location is located. In a geographical region of a particular type, a movement direction of the terminal is predictable. Therefore, a predicted location of the terminal can be more accurate and realistic.

With reference to the first possible implementation of the first aspect, in a second possible implementation of the first aspect, the geographical region type includes a unidirectional corridor, a bidirectional corridor, a unidirectional arc-shaped corridor, a bidirectional arc-shaped corridor, a plaza, and a connection region; where the unidirectional corridor is a rectilinear corridor allowing a pedestrian to walk in one direction;

the bidirectional corridor is a rectilinear corridor allowing a pedestrian to walk in both directions;

the unidirectional arc-shaped corridor is an arc-shaped corridor allowing a pedestrian to walk in one direction;

the bidirectional arc-shaped corridor is an arc-shaped corridor allowing a pedestrian to walk in both directions;

the plaza is a region in which a walking direction of a pedestrian is not restricted; and the connection region is a region connecting at least two geographical regions.

Herein, the geographical region in which the positioning terminal may be located is divided according to the geographical region type. When positioning and location prediction are performed on the terminal, all the predicted locations corresponding to the first location of the terminal can be rapidly determined. Therefore, positioning accuracy of the terminal is further improved, and a positioning speed of the terminal is increased.

With reference to the first aspect, the first possible implementation of the first aspect, or the second possible implementation of the first aspect, in a third possible implementation of the first aspect, the historical movement information of the terminal includes at least one or more of the following: a movement location of the terminal in a preset period previous to the first moment, a movement speed of the terminal in the preset period previous to the first moment, or a movement direction of the terminal in the preset period previous to the first moment.

With reference to any one of the first aspect or the foregoing possible implementations, in a fourth possible implementation of the first aspect, the obtaining, by the terminal according to the first probability and the second probability that are corresponding to each predicted location, a third probability corresponding to each predicted location includes:

performing, by the terminal, weighted summation on the first probability and the second probability that are corresponding to each predicted location, to obtain the third probability corresponding to each predicted location; or multiplying, by the terminal, the first probability and the second probability that are corresponding to each predicted location, to obtain the third probability corresponding to each predicted location.

According to a second aspect, a terminal is provided, including:

a communications device, configured to send and receive a wireless signal;

a sensor, configured to obtain movement information of the terminal; and a processor, configured to:

obtain a first location of the terminal at a first moment;

obtain all predicted locations corresponding to the first location;

obtain, according to historical movement information of the terminal, a first probability corresponding to each predicted location;

obtain signal strength of at least one wireless signal received by the communications device at the second moment;

obtain, according to the signal strength of the at least one wireless signal, a second probability corresponding to each predicted location;

obtain, according to the first probability and the second probability that are corresponding to each predicted location, a third probability corresponding to each predicted location; and determine a predicted location with a highest third probability in all the predicted locations as a second location of the terminal at the second moment; where all the predicted locations include at least two predicted locations, a first probability corresponding to a first predicted location is a probability obtained according to the historical movement information of the terminal by predicting that the terminal is located at the first predicted location at the second moment, the first predicted location is any one of all the predicted locations, the second moment is later than the first moment, and a second probability corresponding to the first predicted location is a probability that is obtained according to the signal strength of the at least one wireless signal and that indicates that the terminal is located at the first predicted location at the second moment.

With reference to the second aspect, in a first possible implementation of the second aspect, when obtaining all the predicted locations corresponding to the first location, the processor is specifically configured to:

obtain a type of a geographical region in which the first location is located; and obtain, according to the type of the geographical region in which the first location is located, all the predicted locations corresponding to the first location; or obtain a type of a geographical region in which the first location is located and a historical movement speed of the terminal;

obtain, according to the type of the geographical region in which the first location is located and the historical movement speed of the terminal, all the predicted locations corresponding to the first location.

Herein, all the predicted locations corresponding to the first location are obtained according to the type of the geographical region in which the first location is located. In a geographical region of a particular type, a movement direction of the terminal is predictable. Therefore, a predicted location of the terminal can be more accurate and realistic.

With reference to the first possible implementation of the second aspect, in a second possible implementation of the second aspect, the geographical region type includes a unidirectional corridor, a bidirectional corridor, a unidirectional arc-shaped corridor, a bidirectional arc-shaped corridor, a plaza, and a connection region; where the unidirectional corridor is a rectilinear corridor allowing a pedestrian to walk in one direction;

the bidirectional corridor is a rectilinear corridor allowing a pedestrian to walk in both directions;

the unidirectional arc-shaped corridor is an arc-shaped corridor allowing a pedestrian to walk in one direction;

the bidirectional arc-shaped corridor is an arc-shaped corridor allowing a pedestrian to walk in both directions;

the plaza is a region in which a walking direction of a pedestrian is not restricted; and the connection region is a region connecting at least two geographical regions.

Herein, the geographical region in which the positioning terminal may be located is divided according to the geographical region type. When positioning and location prediction are performed on the terminal, all the predicted locations corresponding to the first location of the terminal can be rapidly determined. Therefore, positioning accuracy of the terminal is further improved, and a positioning speed of the terminal is increased.

With reference to the second aspect, the first possible implementation of the second aspect, or the second possible implementation of the second aspect, in a third possible implementation of the second aspect, the historical movement information of the terminal includes at least one or more of the following: a movement location of the terminal in a preset period previous to the first moment, a movement speed of the terminal in the preset period previous to the first moment, or a movement direction of the terminal in the preset period previous to the first moment.

With reference to any one of the second aspect or the foregoing possible implementations, in a fourth possible implementation of the second aspect, when obtaining, according to the first probability and the second probability that are corresponding to each predicted location, the third probability corresponding to each predicted location, the processor is specifically configured to:

perform weighted summation on the first probability and the second probability that are corresponding to each predicted location, to obtain the third probability corresponding to each predicted location; or multiply the first probability and the second probability that are corresponding to each predicted location, to obtain the third probability corresponding to each predicted location.

According to a third aspect, an indoor positioning apparatus is provided, including:

a first obtaining unit, configured to:

obtain a first location of the apparatus at a first moment;

obtain all predicted locations corresponding to the first location; and obtain, according to historical movement information of the apparatus, a first probability corresponding to each predicted location;

a second obtaining unit, configured to:

obtain signal strength of at least one wireless signal received by the communications device at the second moment; and obtain, according to the signal strength of the at least one wireless signal, a second probability corresponding to each predicted location;

a third obtaining unit, configured to obtain, according to the first probability and the second probability that are corresponding to each predicted location, a third probability corresponding to each predicted location; and a determining unit, configured to determine a predicted location with a highest third probability in all the predicted locations as a second location of the apparatus at the second moment; where all the predicted locations include at least two predicted locations, a first probability corresponding to a first predicted location is a probability obtained according to the historical movement information of the apparatus by predicting that the apparatus is located at the first predicted location at the second moment, the first predicted location is any one of all the predicted locations, the second moment is later than the first moment, and a second probability corresponding to the first predicted location is a probability that is obtained according to the signal strength of the at least one wireless signal and that indicates that the apparatus is located at the first predicted location at the second moment.

With reference to the third aspect, in a first possible implementation of the third aspect, when obtaining all the predicted locations corresponding to the first location, the first obtaining unit is specifically configured to:

obtain a type of a geographical region in which the first location is located; and obtain, according to the type of the geographical region in which the first location is located, all the predicted locations corresponding to the first location; or obtain a type of a geographical region in which the first location is located and a historical movement speed of the apparatus; and obtain, according to the type of the geographical region in which the first location is located and the historical movement speed of the apparatus, all the predicted locations corresponding to the first location.

Herein, all the predicted locations corresponding to the first location are obtained according to the type of the geographical region in which the first location is located. In a geographical region of a particular type, a movement direction of the apparatus is predictable. Therefore, an obtained predicted location corresponding to the first location of the apparatus is more accurate and realistic.

With reference to the first possible implementation of the third aspect, in a second possible implementation of the third aspect, the geographical region type includes a unidirectional corridor, a bidirectional corridor, a unidirectional arc-shaped corridor, a bidirectional arc-shaped corridor, a plaza, and a connection region; where the unidirectional corridor is a rectilinear corridor allowing a pedestrian to walk in one direction;

the bidirectional corridor is a rectilinear corridor allowing a pedestrian to walk in both directions;

the unidirectional arc-shaped corridor is an arc-shaped corridor allowing a pedestrian to walk in one direction;

the bidirectional arc-shaped corridor is an arc-shaped corridor allowing a pedestrian to walk in both directions;

the plaza is a region in which a walking direction of a pedestrian is not restricted; and the connection region is a region connecting at least two geographical regions.

Herein, the geographical region in which the apparatus may be located is divided according to the geographical region type. When positioning and location prediction are performed on a terminal using the apparatus, all predicted locations corresponding to a first location of the terminal can be rapidly determined. Therefore, positioning accuracy and a positioning speed are further improved.

With reference to the third aspect, the first possible implementation of the third aspect, or the second possible implementation of the third aspect, in a third possible implementation of the third aspect, the historical movement information of the apparatus includes at least one or more of the following: a movement location of the apparatus in a preset period previous to the first moment, a movement speed of the apparatus in the preset period previous to the first moment, and a movement direction of the apparatus in the preset period previous to the first moment.

With reference to any one of the third aspect or the foregoing possible implementations, in a fourth possible implementation of the third aspect, when obtaining, according to the first probability and the second probability that are corresponding to each predicted location, the third probability corresponding to each predicted location, the third obtaining unit is specifically configured to:

perform weighted summation on the first probability and the second probability that are corresponding to each predicted location, to obtain the third probability corresponding to each predicted location; or multiply the first probability and the second probability that are corresponding to each predicted location, to obtain the third probability corresponding to each predicted location.

The embodiments of the present invention provide an indoor positioning solution. The terminal obtains all predicted locations of a current location, predicts, according to the historical movement information of the terminal, a first probability that the terminal passes through each predicted location at a next moment, receives a wireless signal sent by a positioning transmitter, obtains, based on strength of the received signal, a second probability that the terminal passes through each predicted location at the next moment, generates, according to the first probability and the second probability that are corresponding to each predicted location, a third probability corresponding to each predicted location, and determines a predicted location point with a highest third probability as a location of the terminal at the second moment. In this way, in a terminal positioning process, a positioning location of the terminal is predicted by comprehensively analyzing the historical movement information of the terminal and the strength of the wireless signal received by the terminal, instead of simply depending on the strength of the wireless signal received by the terminal. In the terminal positioning process, the historical movement information of the terminal is used to calculate an occurrence probability corresponding to a predicted location. Therefore, jump of the positioning location can be avoided, continuity of the positioning location of the terminal is ensured, user experience is improved, and positioning accuracy can be improved.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The embodiments of the present invention provide an indoor positioning method and apparatus, to resolve a problem of relatively low positioning accuracy in an RSSI based positioning technology. The method and the apparatus are based on a same inventive concept. Because the method and the apparatus have similar principles to resolve a problem, implementation of the apparatus and implementation of the method may reference each other, and details are not repeated.

The following describes implementations of the present invention in detail with reference to the accompanying drawings.

Figure 1:
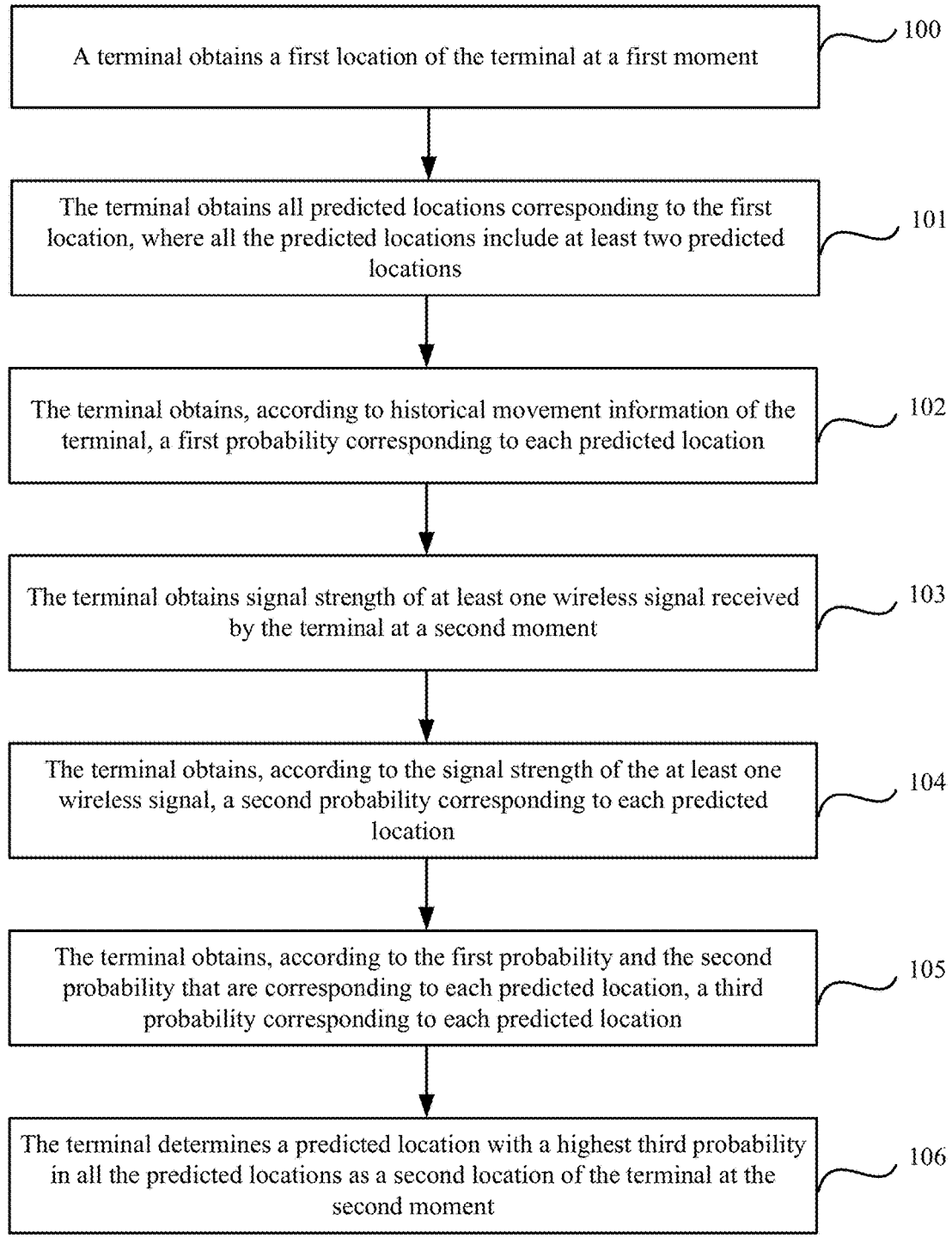
FIG. 1 is a schematic flowchart of an indoor positioning method according to an embodiment of the present invention.

As shown in FIG. 1, FIG. 1 is a flowchart of an indoor positioning method according to an embodiment of the present invention. Accurate positioning can be implemented on a terminal in an indoor region by using the method. A specific process is as follows:

Step 100: The terminal obtains a first location of the terminal at a first moment.

Specifically, in step 100, this embodiment imposes no limitation on a method for the terminal to obtain the first location of the terminal at the first moment. The terminal may obtain the location of the terminal according to an existing indoor positioning technology. During specific implementation, the terminal may obtain the location of the terminal according to the following specific cases:

A first case is as follows: The terminal has already used, before the first moment, the solution in this embodiment for positioning. That is, it is not the first time for the terminal to use the positioning method in this embodiment for positioning. In this case, the first location of the terminal at the first moment is obtained by using the solution of step 100 to step 106 in this embodiment. That is, the location at the first moment, that is, the first location, may be obtained by using the solution in this embodiment according to a location at a moment previous to the first moment and signal strength of a wireless signal received at the first moment.

A second case is as follows: The terminal has not used a positioning function in this embodiment before the first moment. That is, it is the first time for the terminal to use the positioning method in this embodiment at the first moment for positioning. In this case, the terminal may use the following manners to obtain the first location of the terminal at the first moment. A manner is as follows: If the terminal has enabled the positioning function before entering a positioning region, but positioning cannot be performed because the terminal is outside the positioning region and cannot receive a signal from a wireless signal transmitter deployed in the positioning region, usually, when a user is located on a border of the positioning region, for example, at a door, the terminal receives, for the first time, a wireless signal sent by the wireless signal transmitter. Positioning is usually easily determined in such a border region. Therefore, the terminal determines a corresponding border location according to the wireless signal received for the first time, and uses the determined border location as the first location of the terminal at the first moment. Another case is as follows: If the terminal enables the positioning function after entering a positioning region, when the terminal receives a signal from a wireless signal transmitter, the terminal may be located at any location in the positioning region, and has no historical positioning information. In this case, according to the prior art, a location of a positioning transmitter corresponding to a maximum RSSI value received by the terminal may be used as the first location of the terminal at the first moment. Alternatively, another existing positioning manner may be used.

Step 101: The terminal obtains all predicted locations corresponding to the first location, where all the predicted locations include at least two predicted locations.

Specifically, before step 101 is performed, to ensure that the terminal can obtain all the predicted locations corresponding to the first location, geographical region division may be performed, according to a geographical region type, on an indoor positioning region in which the terminal is located, and a geographical region type to which each divided geographical region belongs is notified to the terminal. Optionally, all predicted locations corresponding to each location are predicted according to various types of geographical regions, and then all the predicted locations corresponding to each location are sent to the terminal. Optionally, the terminal externally obtains all the predicted locations corresponding to the first location.

Figure 2:
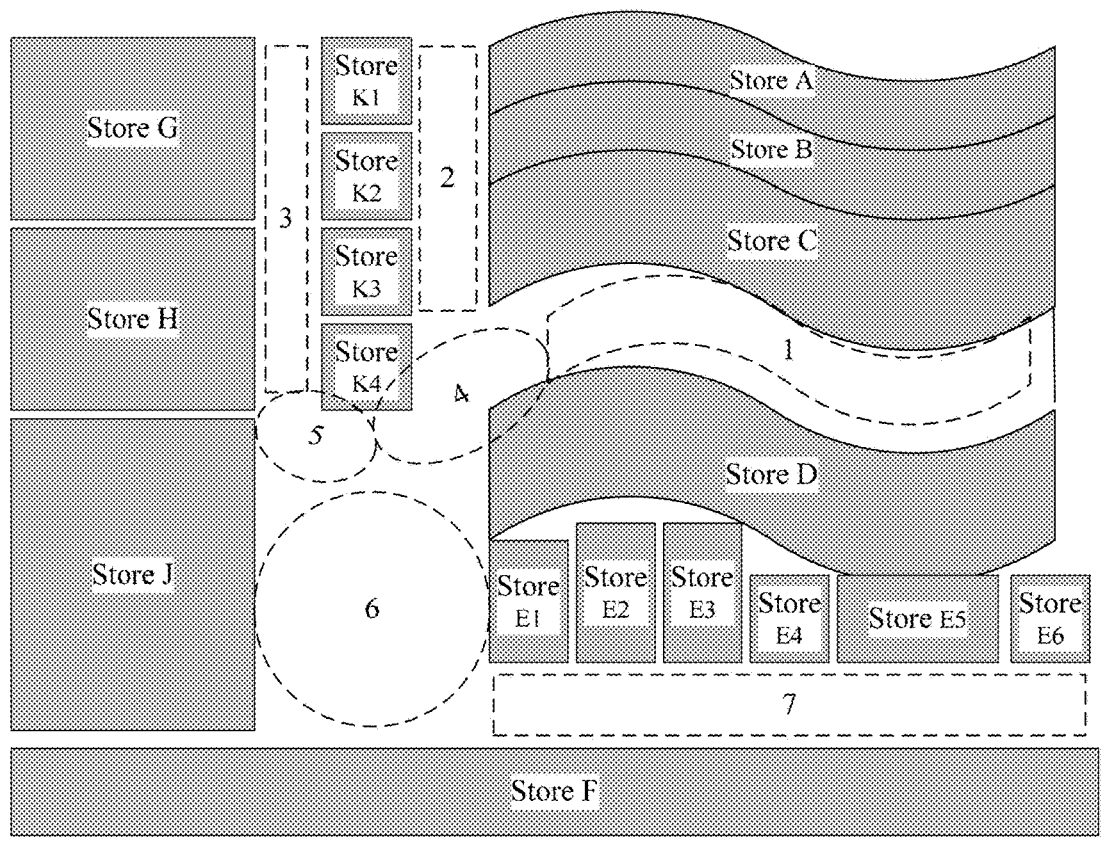
FIG. 2 is a schematic diagram of different geographical regions obtained by means of division in an indoor positioning environment according to an embodiment of the present invention.

A movement trend of a user in a geographical region of a type is predictable. Therefore, for ease of prediction of the movement trend of the terminal, an indoor region in which the terminal is located is divided according to the geographical region type. For example, a unidirectional corridor is a rectilinear corridor allowing a pedestrian to walk in one direction. When a geographical region type of a geographical region in which the first location of the terminal is located is the unidirectional corridor, the movement trend of the terminal is only to keep on moving along the unidirectional corridor. The geographical region type includes a unidirectional corridor, a bidirectional corridor, a unidirectional arc-shaped corridor, a bidirectional arc-shaped corridor, a plaza, and a connection region. The unidirectional corridor is a rectilinear corridor allowing a pedestrian to walk in one direction, and the unidirectional corridor usually appears in an indoor environment such as an airport, a station, or a port of entry that requires traffic control. The bidirectional corridor is a rectilinear corridor allowing a pedestrian to walk in both directions, and the bidirectional corridor is a relatively common geographical region type and usually appears in an indoor environment such as a shopping mall, a supermarket, a garage, or a theater. The unidirectional arc-shaped corridor is an arc-shaped corridor allowing a pedestrian to walk in one direction. The bidirectional arc-shaped corridor is an arc-shaped corridor allowing a pedestrian to walk in both directions. The plaza is a region in which a walking direction of a pedestrian is not restricted, and the user may walk in any direction in the plaza. The connection region is a region connecting at least two geographical regions and includes an entrance, an exit, a branch point, or the like. When the user is located in the connection region, the user may have multiple optional paths. Therefore, the connection region has a relatively high requirement for positioning accuracy. FIG. 2 shows a specific instance of an indoor positioning environment on which geographical region division is performed. FIG. 2 may be an indoor environment of a shopping mall. The shopping mall includes multiple stores (stores A to K) and multiple paths for pedestrians to walk. All paths for walking may be equivalent to the indoor positioning environment in this embodiment. The indoor positioning environment is divided into seven different geographical regions, and geographical region numbers and types are shown in Table 1.

TABLE 1

| Region number | Type |
| --- | --- |
| 1 | Bidirectional arc-shaped corridor |
| 2 | Bidirectional corridor |
| 3 | Bidirectional corridor |
| 4 | Connection region |
| 5 | Connection region |
| 6 | Plaza |
| 7 | Bidirectional corridor |

An entire indoor positioning coverage area is divided into several geographical regions, to help predict a location at which the terminal may be located at a next moment, and improve positioning accuracy of the terminal.

A predicted location of the terminal is a location point at which the terminal may be located at a next positioning moment (that is, a second moment). The predicted location depends on the type of the geographical region in which the first location is located. Different geographical region types are corresponding to different predicted locations.

Specifically, when obtaining all the predicted locations corresponding to the first location, the terminal may directly obtain, from a server side based on the first location, all the predicted locations corresponding to the first location, where all the predicted locations corresponding to the first location are preset based on the type of the geographical region in which the first location is located. Alternatively, the terminal may further use either of the following two manners to obtain all the predicted locations corresponding to the first location.

A first manner is as follows: The terminal obtains the type of the geographical region in which the first location is located, and obtains, according to the type of the geographical region in which the first location is located, all the predicted locations corresponding to the first location.

For example, the terminal determines that the geographical region type of the geographical region in which the first location is located is a corridor. For the corridor, there is only a one-dimensional component. Therefore, the predicted location of the first location is a proximity location of the first location in a corridor direction. For a unidirectional corridor, a predicted location of the first location is a proximity location in a direction ahead of a specified walking direction. In a bidirectional corridor in an instance shown in FIG. 3, it is assumed that a current location point, that is, a first location point, of the terminal is a point 0. In the bidirectional corridor, the user may perform bidirectional movement in a corridor direction, or may keep still. Therefore, the terminal may be located at a point 1 or a point 2, or may be still located at the point 0 at the next moment. That is, predicted location points of the first location are the points 0, 1, and 2.

For another example, the terminal determines that the geographical region type of the geographical region in which the first location is located is a connection region. For the connection region, when the terminal is located in the connection region, the user using the terminal has multiple optional paths. Therefore, the predicted locations of the first location should include all geographical regions that are connected to the connection region. In a connection region in an instance shown in FIG. 4, a current location point, that is, a first location point, of the terminal is a point 0. The connection region connects two bidirectional corridors, the user may perform bidirectional movement along either bidirectional corridor connected to the connection region, or may keep still. Therefore, the terminal may be located at a point 1, a point 2, a point 3, or a point 4, or may be still located at the point 0 at the next moment. That is, predicted location points of the first location are the points 0, 1, 2, 3, and 4.

For still another example, the terminal determines that the geographical region type of the geographical region in which the first location is located is a plaza. For the plaza, the user using the terminal may walk in any direction. Therefore, the predicted locations of the first location are a proximity location in each direction of the first location. In a plaza in an instance shown in FIG. 5, a current location point, that is, a first location point, of the terminal is a point 0. In the plaza, the user may move along any direction of the current location point, or may keep still. Therefore, the terminal may be located at a point 1, a point 2, a point 3, a point 4, a point 5, a point 6, a point 7, or a point 8, or may be still located at the point 0 at the next moment. That is, predicted location points of the first location are the points 0, 1, 2, 3, 4, 5, 6, 7, and 8.

A second manner is as follows: The terminal obtains the type of the geographical region in which the first location is located and a historical movement speed of the terminal, and obtains, according to the type of the geographical region in which the first location is located and the historical movement speed of the terminal, all the predicted locations corresponding to the first location.

In the foregoing second manner, the terminal determines the geographical region type of the geographical region in which the first location is located, and determines, according to the region type, directions of all the predicted locations that are corresponding to the first location and that are located in the geographical region in which the first location is located. Further, the terminal determines a quantity of predicted locations based on a historical movement speed of the terminal at the first location and a historical movement speed of the terminal previous to the first location.

Figure 6:
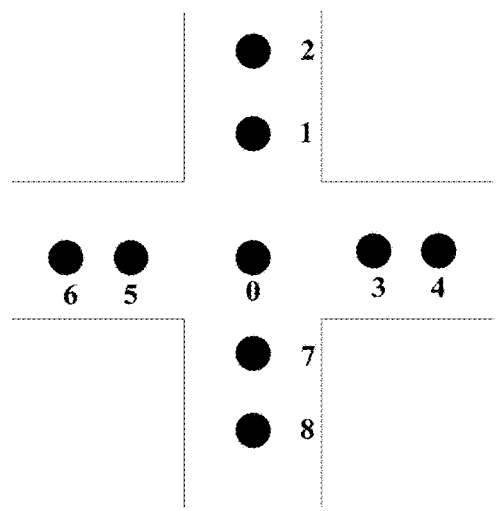
FIG. 6 is a schematic diagram of a predicted location corresponding to another connection region according to an embodiment of the present invention.

For example, the terminal determines that the geographical region type of the geographical region in which the first location is located is a connection region. For the connection region, when the terminal is located in the connection region, the user using the terminal has multiple optional paths. Therefore, the predicted locations of the first location should include all geographical regions that are connected to the connection region. In a connection region in an instance shown in FIG. 6, the user has optional paths in four directions. Further, the terminal may determine, according to the historical movement speed of the terminal, a quantity of predicted location points distributed in each direction. A higher historical movement speed of the terminal is corresponding to a larger quantity of predicted location points of the first location. It is assumed that a movement speed V1 of the terminal at the first location is greater than a preset threshold V0 and is less than twice of V0. Then, a quantity of predicted locations distributed in each direction of an optional path is twice of the quantity when the movement speed is less than the threshold. A current location point, that is, a first location point, of the terminal is a point 0. Therefore, the predicted location points of the first location are points 0, 1, 2, 3, 4, 5, 6, 7, and 8.

Step 102: The terminal obtains, according to historical movement information of the terminal, a first probability corresponding to each predicted location.

A first probability corresponding to a first predicted location is a probability obtained according to the historical movement information of the terminal by predicting that the terminal is located at the first predicted location at a second moment. The first predicted location is any one of all the predicted locations. The second moment is later than the first moment.

Specifically, the historical movement information of the terminal includes at least one or a combination of the following: a movement location of the terminal in a preset period previous to the first moment, a movement speed of the terminal in the preset period previous to the first moment, or a movement direction of the terminal in the preset period previous to the first moment.

Further, the terminal can obtain a correspondence between each predicted location, a location change, and a movement status based on the historical movement speed of the terminal and the first location. Table 2 shows a correspondence between a predicted location, a location change, and a movement status in the corridor shown in FIG. 3.

TABLE 2

| Predicted location point | Movement status | Location change |
|---|---|---|
| 2 | Keep moving ahead | 0 → 2 |
| 0 | Keep still | 0 → 0 |
| 1 | Move back | 0 → 1 |

Figure 3:
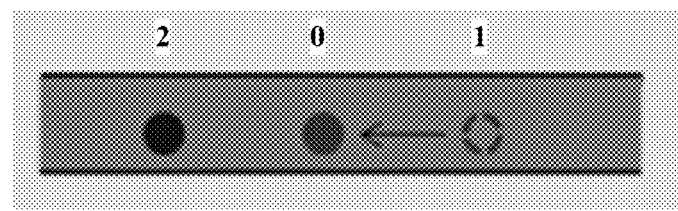
FIG. 3 is a schematic diagram of a predicted location corresponding to a geographical region of a bidirectional corridor type according to an embodiment of the present invention.

In the bidirectional corridor shown in FIG. 3, the current positioning location point, that is, the first location point, of the terminal is the point 0. Therefore, the predicted location points of the first location are the points 0, 1, and 2. It can be learned from the historical movement information of the terminal that a positioning location point at a previous moment is the point 1, and a movement direction of the user is 1→0. Different predicted positioning location points are corresponding to different movement statuses. For example, a location change 0→2 means that a movement status of the user is to keep moving ahead. Likewise, a location change 0→0 means that a movement status of the user is to keep still at the point 0; and a location change 0→1 means that the user moves back.

Figure 4:
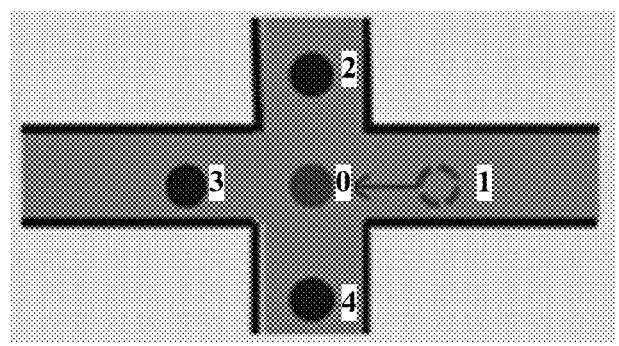
FIG. 4 is a schematic diagram of a predicted location corresponding to a geographical region of a connection region type according to an embodiment of the present invention.

Table 3 shows a correspondence between a predicted location, a location change, and a movement status in the connection region shown in FIG. 4.

TABLE 3

| Predicted location point | Movement status | Location change |
| --- | --- | --- |
| 3 | Keep moving ahead | 0 → 3 |
| 0 | Keep still | 0 → 0 |
| 1 | Move back | 0 → 1 |
| 4 | Turn left | 0 → 4 |
| 5 | Turn right | 0 → 5 |

In the connection region in the instance shown in FIG. 4, the current positioning location point, that is, the first location point, is the point 0. Therefore, the predicted location points of the first location are the points 0, 1, 2, 3, and 4. It can be learned from the historical movement information of the terminal that a positioning location point at a previous moment is the point 1, and a movement direction of the user is 1→0. Likewise, different predicted positioning location points are corresponding to different movement statuses. That is, a location change 0→3 means that the user keeps moving ahead, 0→0 means that the user keeps still at the point 0, 0→1 means that the user moves back, 0→4 means that the user turns left, and 0→2 means that the user turns right.

Figure 5:
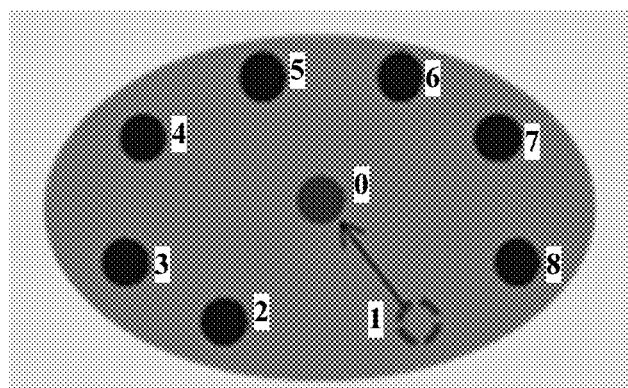
FIG. 5 is a schematic diagram of a predicted location corresponding to a geographical region of a plaza type according to an embodiment of the present invention.

Table 4 shows a correspondence between a predicted location, a location change, and a movement status in the plaza shown in FIG. 5.

TABLE 4

| Predicted location point | Movement status | Location change |
| --- | --- | --- |
| 5 | Keep moving ahead | 0 → 5 |
| 0 | Keep still | 0 → 0 |
| 1 | Move back | 0 → 1 |
| 4 | Left front | 0 → 4 |
| 6 | Right front | 0 → 6 |
| 3 | Turn left | 0 → 3 |
| 7 | Turn right | 0 → 7 |
| 2 | Left rear | 0 → 2 |
| 8 | Right rear | 0 → 8 |

In the plaza in the instance shown in FIG. 5, the current positioning location point, that is, the first location point, is the point 0. Therefore, the predicted location points of the first location are the points 0, 1, 2, 3, 4, 5, 6, 7, and 8. It can be learned from the historical movement information of the terminal that a positioning location point at a previous moment is the point 1, and a movement direction of the user is 1→0. Selected predicted positioning location points are adjacent positioning location points in eight directions surrounding the point 0. Therefore, the predicted positioning location points are nine points: the point 0 to the point 8. Likewise, location changes at different predicted positioning location points are corresponding to different movement statuses.

It can be learned that different predicted locations are corresponding to different movement directions and movement statuses of the terminal at the next moment, and not all occurrence probabilities of these movement statuses are the same. Therefore, an occurrence probability that the terminal passes through each predicted location in all the foregoing predicted locations is also different. In step 202, the terminal predicts, according to the historical movement information of the terminal, the first probability that the terminal passes through each predicted location in all the predicted locations.

Figure 7:
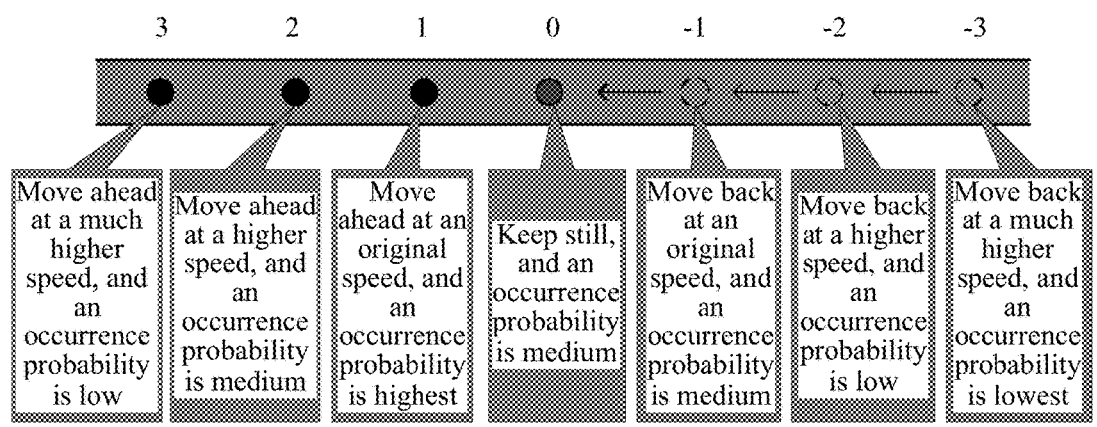
FIG. 7 is a diagram of a specific instance of a first probability calculated for each predicted location in a bidirectional corridor according to an embodiment of the present invention.

Specifically, the following two inferences may be used for calculation to predict the first probability that the terminal passes through each predicted location in all the predicted locations: 1. A probability that a walking direction of the user remains unchanged in a period of time is relatively high. That is, if the user using the terminal has moved ahead in a direction in a previous period of time, a probability that the user keeps moving ahead in the direction at a next moment is relatively high. 2. A probability that a walking speed of the user using the terminal keeps slight fluctuation in a period of time is relatively high. That is, a person is prone to walk at a constant speed during walking, and the walking speed slightly fluctuates in a range. Occurrence probabilities that different terminals pass through different predicted locations may be obtained based on the foregoing two inferences and correspondences between movement statuses and predicted locations of the terminals. FIG. 7 shows a schematic diagram of a specific instance of a first probability calculated for each predicted location in a bidirectional corridor.

It can be learned from FIG. 7 that a location point of the terminal at a current moment is a point 0. It can be learned from the historical movement information of the terminal that a historical movement track of the terminal in a preset period previous to the current moment is −3→−2→−1→0, and the user using the terminal walks to the left (a direction from a point −3 to a point 3) in the rectilinear corridor. The predicted location points of the first location are obtained according to the type of the geographical region in which the first location is located and the movement speed of the terminal and are seven positioning location points: points −3, −2, −1, 0, 1, 2, and 3. Different predicted location points are corresponding to different movement statuses. That is, the point 1 (0→1) represents that the user keeps moving ahead at an original speed. This case is continuations of a movement status and a movement trend of the current terminal. Therefore, an occurrence probability is highest, and the occurrence probability corresponding to the point 1 is indicated as P1. The point 2 (0→2) represents that the user using the terminal moves ahead in the movement direction at a speed twice the original speed. An occurrence probability is medium, and the occurrence probability corresponding to the point 2 is indicated as P2. The point 3 (0→3) represents that the user moves ahead in the movement direction at a speed three times the original speed. Because the speed changes dramatically, an occurrence probability is low, and the occurrence probability corresponding to the point 3 is indicated as P3. A point 4 (0→4) represents that the user keeps still at the point 0. An occurrence probability is medium, and the occurrence probability corresponding to the point 4 is indicated as P4. The point −1 (0→−1) represents that the user using the terminal changes the original movement direction to move back, and walks at the original speed. An occurrence probability is medium, and the occurrence probability corresponding to the point −1 is indicated as P1'. The point −2 (0→−2) represents that the user using the terminal changes the original walking direction to move back, and walks at a speed twice the original speed. An occurrence probability is low, and the occurrence probability corresponding to the point −2 is indicated as P2'. The point −3 (0→−3) represents that the user using the terminal changes the original walking direction to move back, and walks at a speed three times the original speed. An occurrence probability is lowest, and the occurrence probability corresponding to the point −3 is indicated as P3'. For another positioning location point in the positioning region, a distance between the another positioning location point and a current location is relatively long. It may be considered that the user is unlikely to move to the another positioning location point at the next positioning moment. Therefore, the another positioning location point is not a predicted location point.

According to the foregoing analysis, a magnitude sequence of the occurrence probabilities corresponding to all the predicted location points may be obtained, that is, P1>P2=P4=P1'>P3=P2'>P3'. In the instance in FIG. 7, magnitudes of the occurrence probabilities that the user walks from the first location to the predicted locations may be set in a multiple relationship, that is, P1=2P2=4P3=8P3'. Certainly, such specific values may also be specifically set according to an actual case. Therefore, in the instance, the occurrence probability P1 of 0→1 is equal to 0.32, the occurrence probability P2 of 0→2 is equal to 0.16, the occurrence probability P3 of 0→3 is equal to 0.08, the occurrence probability P4 of 0→0 is equal to 0.16, the occurrence probability P1' of 0→−1 is equal to 0.16, the occurrence probability P2' of 0→−2 is equal to 0.08, and the occurrence probability P3' of 0→−3 is equal to 0.04.

Step 103: The terminal obtains signal strength of at least one wireless signal received by the terminal at a second moment.

Step 104: The terminal obtains, according to the signal strength of the at least one wireless signal, a second probability corresponding to each predicted location.

A second probability corresponding to the first predicted location is a probability that is obtained according to the signal strength of the at least one wireless signal and that indicates that the terminal is located at the first predicted location at the second moment.

The terminal may receive, at the second moment, wireless signals sent by multiple wireless signal transmitters (Wi-Fi APs or BLE Beacons). The terminal extracts RSSI features according to signal strength of the received wireless signals, and obtains, according to the RSSI features, a probability corresponding to a location of the terminal at the second moment. The probability is referred to as an RSSI feature probability. The RSSI features herein may be classified into two types: an RSSI absolute value and an RSSI size relationship.

RSSI absolute value: The RSSI absolute value can reflect a distance between a positioning location and a nearest wireless signal transmitter. Field test data shows that, when a linear distance between the terminal and the transmitter is within 1 m, an RSSI value received is maximum with a small change amplitude, and basically can remain stable at −55 to −60 dBm (decibel-milliwatt); and when the distance is greater than 2 m, the RSSI is greatly reduced to below −70 dBm, and the changing amplitude begins to increase. Therefore, when the wireless signals received by the terminal include a signal with an RSSI absolute value greater than −60 dBm, the positioning location falls within a range quite near a location of a wireless transmitter corresponding to the positioning location.

RSSI magnitude relationship: In a terminal positioning process, the terminal receives wireless signals sent by multiple wireless signal transmitters. RSSIs of these wireless signals form a magnitude relationship. Generally, a transmitter with a larger RSSI value is nearer to a user location. However, because of impact of multiple interference factors such as a body block and traffic, such a correspondence becomes unstable.

Figure 8:
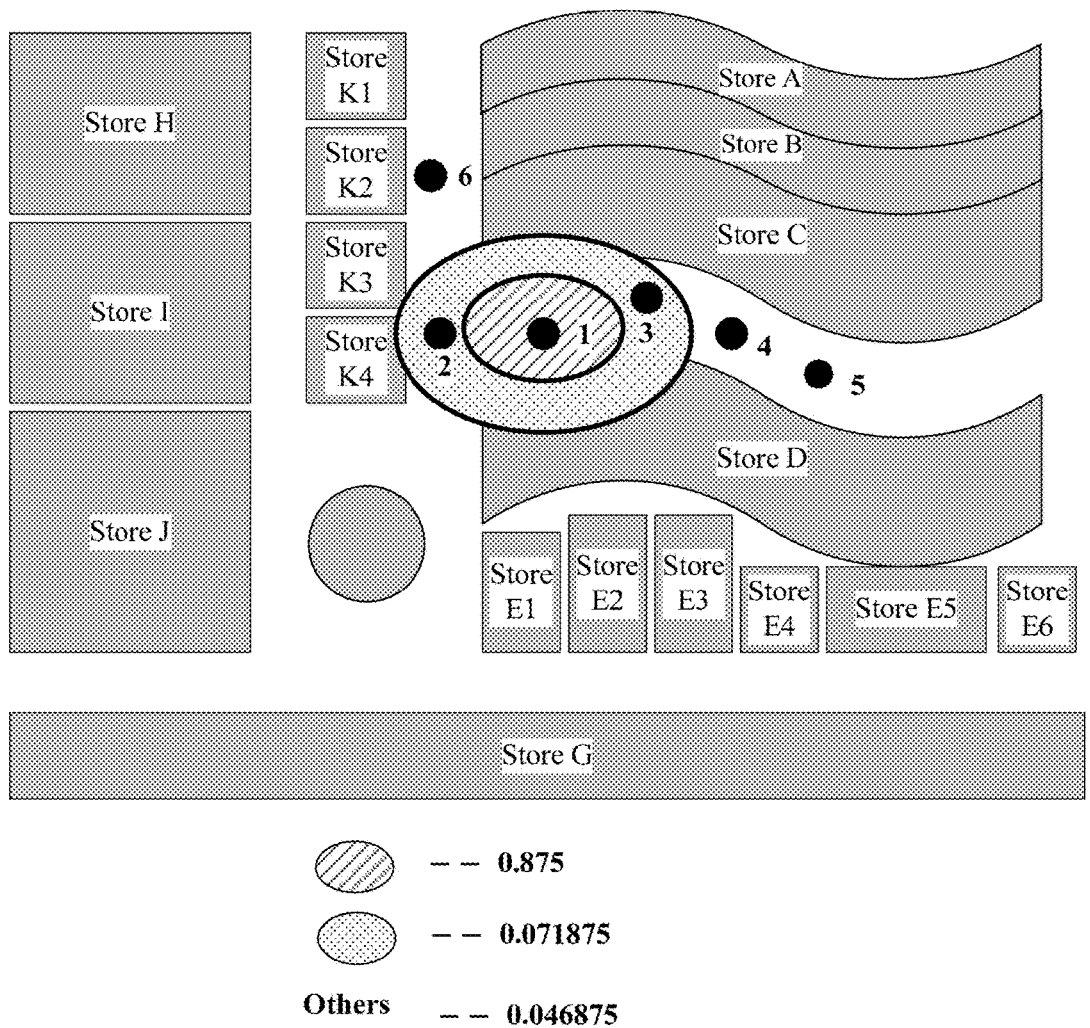
FIG. 8 is a schematic diagram of RSSI feature space probability distribution according to an embodiment of the present invention.

Further, after the probability corresponding to the location of the terminal is obtained according to the RSSIs of the received wireless signals, RSSI feature space probability distribution is usually generated by using a sample training method. A specific process is as follows: First, several sample location points are selected in a coverage area in which a wireless signal transmitter used for indoor positioning has already been deployed. RSSIs of signals transmitted by the wireless transmitter are collected from these sample location points, to obtain RSSIs of wireless signals received by the terminal and a training sample of such a correspondence at the location of the terminal. During specific implementation, signal collection should be performed multiple times at a same sample location point, to ensure a training sample size. Generally, a larger sample size indicates that a training result can reflect more about an occurrence probability corresponding to a positioning location in an actual case, and sample training reliability is also higher. After collection of training samples is completed, RSSI features of the training samples are extracted, that is, the foregoing two RSSI features: the RSSI absolute value and the RSSI magnitude relationship. It is assumed that an indoor region covers four wireless signal transmitters. In this case, specific RSSI features are as follows: Feature 1 is that a wireless transmitter 1 has a maximum RSSI and has an RSSI absolute value greater than −60 dBm; feature 2 is that a wireless transmitter 2 has a maximum RSSI and has an RSSI absolute value greater than −60 dBm; and feature 3 is that wireless transmitters 1 and 2 have RSSIs greater than RSSIs of signals of other transmitters and the transmitters 1 and 2 have RSSI absolute values falling within a range from −60 to −70 dBm, and so on. After these RSSI features are extracted, each sample data satisfying a particular RSSI feature is screened out from the training samples, and a quantity of the sample data falling within a specific location range is counted. RSSI feature space probability distribution shown in FIG. 8 is used as an example. A total of 10000 training samples are collected in a sample collection phase, and a total of 320 training samples satisfying the feature 1 are screened out. In the 320 training samples, distances between collection location points of 280 training samples and a deployment location of the transmitter 1 fall within 5 meters, distances between collection location points of 25 training samples and the deployment location of the transmitter 1 fall within a range from 5 meters to 10 meters, and distances between collection location points of only 15 training samples and the deployment location of the transmitter 1 fall beyond 10 meters. In this way, space probability distribution at the location can be obtained according to the collected RSSIs, that is, the RSSI feature space probability distribution is generated. In this case, when an RSSI of a signal collected by the terminal satisfies the feature 1, that is, the transmitter 1 has the maximum RSSI and has the RSSI absolute value greater than −60 dBm, RSSI feature space probability distribution corresponding to the terminal can be obtained as follows: A probability that the distances to the deployment location of the transmitter 1 fall within 5 meters is 280/320=0.875; a probability that the distances to the deployment location of the transmitter 1 fall within the range from 5 meters to 10 meters is 25/320=0.078175; and a probability that the distances to the deployment location of the transmitter 1 fall beyond 10 meters is 15/320=0.046875. Likewise, RSSI feature space probability distribution corresponding to the feature 2, the feature 3, and all other features can be obtained by using the foregoing method. It should be noted that, in different indoor positioning places, factors such as deployment density, a deployment manner, and transmit power of wireless signal transmitters are different. Therefore, constructed training samples are merely used in a particular indoor positioning coverage area and are not a general-purpose training sample library.

Next, the terminal maps each predicted location onto a location point in the RSSI feature space probability distribution, that is, finds, in the RSSI feature space probability distribution, a location coordinate point corresponding to each predicted location, and obtains, according to specific location coordinates of each predicted location, the second probability corresponding to each predicted location. For example, in the instance in FIG. 7, a distance between the predicted location point 1 and the deployment location of the transmitter 1 falls within 5 meters. Therefore, a second probability corresponding to the predicted location 1 is 0.875.

Step 105: The terminal obtains, according to the first probability and the second probability that are corresponding to each predicted location, a third probability corresponding to each predicted location.

Optionally, obtaining, according to the first probability and the second probability that are corresponding to each predicted location, the third probability corresponding to each predicted location specifically includes the following implementations:

Manner 1: The terminal performs weighted summation on the first probability and the second probability that are corresponding to each predicted location, to obtain the third probability corresponding to each predicted location.

For example, in the instance in FIG. 7, an occurrence probability that the terminal passes through a predicted location, that is, the first probability and the second probability that is corresponding to each predicted location and that is obtained by using the RSSI feature space probability distribution are considered comprehensively, to finally obtain the third probability corresponding to each predicted location. A specific process is as follows: The terminal determines a specific coordinate location point of each predicted location in the RSSI feature space probability distribution, further obtains an RSSI feature probability corresponding to each predicted location, that is, the second probability, and obtains the third probability by performing weighted summation on the first probability and the second probability. Assuming that weights of the first probability and the second probability are set to 0.5, the third probability obtained by means of weighted summation=first probability×0.5+second probability×0.5. For a specific result, refer to Table 5. Different weight values of the first probability and the second probability may be set according to an actual case.

TABLE 5

| Movement status | Predicted location point | First probability | Second probability (RSSI feature probability) | Third probability (weighted summation) |
|---|---|---|---|---|
| Move ahead at an original speed | 1 | 0.32 | 0.62 | 0.47 |
| Move ahead at a speed twice the original speed | 2 | 0.16 | 0.58 | 0.35 |
| Move ahead at a speed twice the original speed, and then turn right | 3 | 0.08 | 0.37 | 0.275 |
| Keep still | 0 | 0.16 | 0.55 | 0.355 |
| Move back at the original speed | −1 | 0.16 | 0.36 | 0.26 |

TABLE 5-continued

| Movement status | Predicted location point | First probability | Second probability (RSSI feature probability) | Third probability (weighted summation) |
|---|---|---|---|---|
| Move back at a speed twice the original speed | −2 | 0.08 | 0.22 | 0.15 |
| Move back at a speed three times the original speed | −3 | 0.04 | 0 | 0.02 |

Manner 2: The terminal multiplies the first probability and the second probability that are corresponding to each predicted location, to obtain the third probability corresponding to each predicted location.

For example, in the instance in FIG. 7, an occurrence probability that the terminal passes through a predicted location, that is, the first probability and the second probability that is corresponding to each predicted location and that is obtained by using the RSSI feature space probability distribution are considered comprehensively, to finally obtain the third probability corresponding to each predicted location. A specific process is as follows: The terminal determines a specific coordinate location point of each predicted location in the RSSI feature space probability distribution, further obtains an RSSI feature probability corresponding to each predicted location, that is, the second probability, and obtains the third probability by multiplying the first probability and the second probability. For a specific result, refer to Table 6.

TABLE 6

| Movement status | Predicted location point | First probability | Second probability (RSSI feature probability) | Third probability (product) |
|---|---|---|---|---|
| Move ahead at an original speed | 1 | 0.32 | 0.62 | 0.1984 |
| Move ahead at a speed twice the original speed | 2 | 0.16 | 0.58 | 0.0928 |
| Move ahead at a speed twice the original speed, and then turn right | 3 | 0.08 | 0.37 | 0.0296 |
| Keep still | 0 | 0.16 | 0.55 | 0.0880 |
| Move back at the original speed | −1 | 0.16 | 0.36 | 0.0576 |
| Move back at a speed twice the original speed | −2 | 0.08 | 0.22 | 0.0176 |
| Move back at a speed three times the original speed | −3 | 0.04 | 0 | 0 |

Step 106: The terminal determines a predicted location with a highest third probability in all the predicted locations as a second location of the terminal at the second moment.

It can be learned from the foregoing instance in FIG. 7 that a third probability corresponding to the predicted location point 1 is highest. Therefore, the point 1 is determined as the location of the terminal at the second moment.

Based on a same inventive concept as the embodiment shown in FIG. 1, an embodiment of the present invention further provides a terminal having an indoor positioning function. The terminal may be a mobile phone, a tablet computer (Tablet Personal Computer), a laptop computer (Laptop Computer), a multimedia player, a digital camera, a personal digital assistant (personal digital assistant, PDA), a navigation apparatus, a mobile Internet device (Mobile Internet Device, MID), a wearable device (Wearable Device), or the like.

Figure 9:
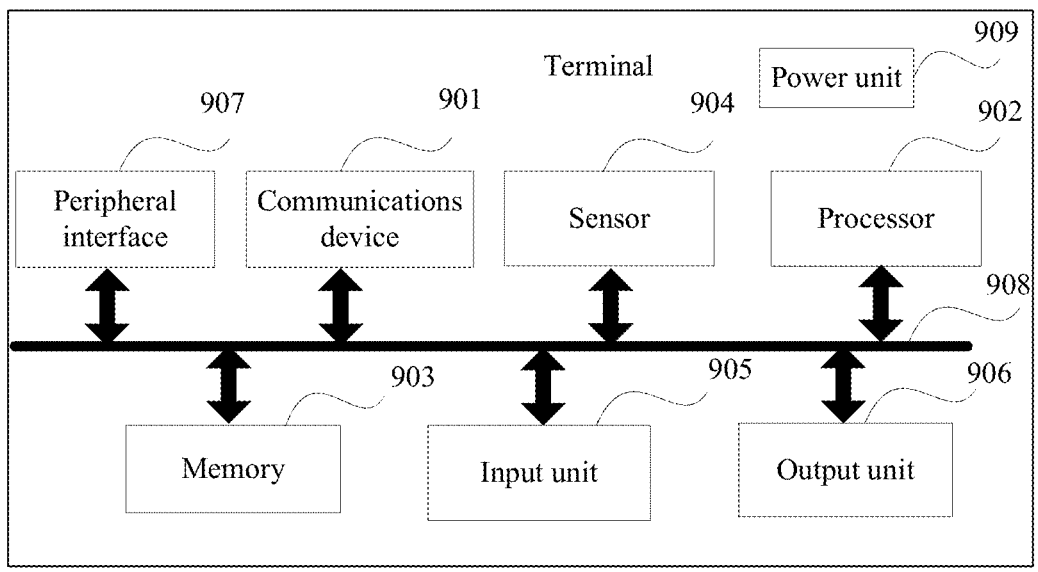
FIG. 9 is a schematic structural diagram of an indoor positioning terminal according to an embodiment of the present invention.

FIG. 9 shows a specific implementation of a terminal according to an embodiment of the present invention. The terminal includes a communications device 901, a processor 902, a memory 903, a sensor 904, an input unit 905, an output unit 906, and a peripheral interface 907. The communications device 901, the processor 902, the memory 903, the sensor 904, the input unit 905, the output unit 906, and the peripheral interface 907 are connected to each other. This embodiment of the present invention imposes no limitation on a specific connection medium between the foregoing components. In this embodiment of the present invention, the communications device 901, the processor 902, the memory 903, the sensor 904, the input unit 905, the output unit 906, and the peripheral interface 907 in FIG. 9 are connected by using a bus 908. The bus is represented by one bold line in FIG. 9. A connection manner between other components is merely an example for description and is not limited herein. The bus may be classified into an address bus, a data bus, a control bus, and the like. For ease of denotation, the bus is represented by only one bold line in FIG. 9; however, it does not indicate that there is only one bus or one type of bus.

A structure of the terminal shown in FIG. 9 constitutes no limitation on the present invention. The terminal may be a bus structure or a star structure. Alternatively, the terminal may include components more or fewer than those in FIG. 9, a combination of some components, or components deployed differently.

In this embodiment of the present invention, the communications device 901 is configured to send and receive a wireless signal.

The sensor 904 is configured to obtain movement information of the terminal.

The processor 902 is configured to: obtain a first location of the terminal at a first moment; obtain all predicted locations corresponding to the first location; obtain, according to historical movement information of the terminal, a first probability corresponding to each predicted location; obtain signal strength of at least one wireless signal received by the communications device at the second moment; obtain, according to the signal strength of the at least one wireless signal, a second probability corresponding to each predicted location; obtain, according to the first probability and the second probability that are corresponding to each predicted location, a third probability corresponding to each predicted location; and determine a predicted location with a highest third probability in all the predicted locations as a second location of the terminal at the second moment; where all the predicted locations include at least two predicted locations, a first probability corresponding to a first predicted location is a probability obtained according to the historical movement information of the terminal by predicting that the terminal is located at the first predicted location at the second moment, the first predicted location is any one of all the predicted locations, the second moment is later than the first moment, and a second probability corresponding to the first predicted location is a probability that is obtained according to the signal strength of the at least one wireless signal and that indicates that the terminal is located at the first predicted location at the second moment.

The memory 903 in this embodiment of the present invention is configured to store program code executed by the processor 902. The memory 903 mainly includes a program storage area and a data storage area. The program storage area may store an operating system, an application program required by at least one function, such as a sound playing program or an image playing program, and the like. The data storage area may store data created according to use of the terminal, such as audio data and a phone book. In a specific implementation of this embodiment of the present invention, the memory 903 may include a volatile memory such as a nonvolatile dynamic random access memory (Nonvolatile Random Access Memory, NVRAM), a phase change random access memory (Phase Change RAM, PRAM), or a magnetoresistive random access memory (Magetoresistive RAM, MRAM), or may include a nonvolatile memory such as at least one magnetic disk storage component, an electrically erasable programmable read-only memory (Electrically Erasable Programmable Read-Only Memory, EEPROM), or a flash memory component, for example, a NOR flash memory (NOR flash memory) or a NAND flash memory (NAND flash memory). Alternatively, the memory 903 is, but not limited to, any other medium that can be used to carry or store expected program code in a form of an instruction or a data structure and can be accessed by a computer. The memory 903 may be a combination of the foregoing memories.

The nonvolatile memory stores an operating system and an application program that are executed by the processor 902. The processor 902 loads a running program and data from the nonvolatile memory into a memory and stores digital content into a large-capacity storage apparatus. The operating system includes a conventional system task used for control and management, such as memory management, storage device control, and power management, and various components and/or drives facilitating communication between various software and hardware. In an implementation of the present invention, the operating system may be Android (Android system), an iOS system, a Windows operating system, or the like, or may be an embedded operating system such as Vxworks.

The application program includes any application installed on the terminal, including but not limited to a browser, an email, an instant message service, word processing, keyboard virtualization, a widget (Widget), encryption, digital copyright management, speech recognition, speech reproduction, positioning, music playback, or the like.

The processor 902 in this embodiment of the present invention is connected to all parts of the entire terminal by using various interfaces and cables, runs or executes a software program and/or a module stored in a storage unit, and invokes data stored in the memory 901, to perform the method shown in FIG. 1. The processor 902 may include an integrated circuit (Integrated Circuit, IC), for example, may include a single packaged IC or may include multiple connected packaged ICs with a same function or different functions. For example, the processor 902 may include only a central processing unit (Central Processing Unit, CPU), or may be a combination of a CPU, a digital signal processor (Digital Signal Processor, DSP), and a control chip such as a baseband chip in the communications device 901. In an implementation of the present invention, the CPU may be a single-operation core, or may include a multi-operation core.

The communications device 901 in this embodiment of the present invention is mainly configured to send and receive a wireless signal. The communications device 901 is further configured to establish a communications channel, so that the terminal is connected to a remote server by using the communications channel and downloads media data from the remote server. The communications device 901 may include a communications module, such as a wireless local area network (Wireless Local Area Network, wireless LAN for short) module, a Bluetooth module, or a baseband (Base Band) module, and a radio frequency (Radio Frequency, RF for short) circuit corresponding to the communications module. The communications device 901 is configured to perform wireless local area network communication, Bluetooth communication, infrared communication, and/or cellular communications system communication, for example, Wideband Code Division Multiple Access (Wideband Code Division Multiple Access, W-CDMA for short) and/or High Speed Downlink Packet Access (High Speed Downlink Packet Access, HSDPA for short). The communications module is configured to control communication between components in the terminal and may support direct memory access (Direct Memory Access).

In different implementations of the present invention, various communications modules in the communications device 901 are generally implemented in a form of an integrated circuit chip (Integrated Circuit Chip), and may be selectively combined. However, the communications device 901 does not need to include all communications module and a corresponding antenna group. For example, the communications device 901 may include only a baseband chip, a radio frequency chip, and a corresponding antenna, to provide a communication function in a cellular communications system. The terminal may be connected to a cellular network (Cellular Network) or the Internet (Internet) by using a wireless communication connection established by the communications device 901, for example, wireless local area network access or WCDMA access. In some optional implementations of the present invention, the communications module, for example, the baseband module, in the communications device 901 may be integrated into the processor 902.

The radio frequency circuit is configured to send and receive information or send and receive a signal during a call. For example, after receiving downlink information of a base station, the radio frequency circuit sends the downlink information to a processing unit for processing. In addition, the radio frequency circuit sends uplink data to the base station. Generally, the radio frequency circuit includes a well-known circuit configured to perform these functions, including but not limited to an antenna system, a radio frequency transceiver, one or more amplifiers, a tuner, one or more oscillators, a digital signal processor, a codec (Codec) chipset, a subscriber identity module (SIM) card, a memory, and the like. In addition, the radio frequency circuit may further communicate with a network and another device by means of wireless communication. In the wireless communication, any communication standard or protocol may be used, including but not limited to a global system for mobile communications (Global System of Mobile communication, GSM), a general packet radio service (General Packet Radio Service, GPRS), Code Division Multiple Access (Code Division Multiple Access, CDMA), WCDMA (Wideband Code Division Multiple Access, Wideband Code Division Multiple Access), a High Speed Uplink Packet Access (High Speed Uplink Packet Access, HSUPA) technology, LTE (Long Term Evolution, Long Term Evolution), an email, an SMS (Short Messaging Service, short message service), and the like.

The input unit 905 in this embodiment of the present invention is configured to: implement interaction between a user and the terminal, and/or input information into the terminal. For example, the input unit 905 may receive digit or character information input by the user, to generate signal input related to a user configuration or function control. In a specific implementation of the present invention, the input unit 905 may be a touch panel, or may be another human-machine interaction interface, for example, a substantive input key or a microphone, or may be another external-information capture apparatus, for example, a camera. The touch panel is also referred to as a touchscreen or a touch control screen and may collect a touch or proximity operation of the user. For example, the user uses any appropriate object or accessory, such as a finger or a stylus, to perform an operation on the touch panel or at a location in proximity of the touch panel, and drive a corresponding connection apparatus according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and then sends the contact coordinates to the processor 902. The touch controller may further receive and execute a command sent by the processor 902. In addition, the touch panel may be implemented in multiple types such as a resistive type, a capacitive type, an infrared (Infrared) type, and a surface acoustic wave type. In another implementation of the present invention, the substantive input key used by the input unit 905 may include but is not limited to one of or a combination of a physical keyboard, a function key such as a volume control button or a switch button, a trackball, a mouse, a joystick, or the like. The input unit 905 in a microphone form may collect a voice input by the user or an environment and convert the voice into a command that is in an electrical signal form and that can be executed by the processor 902.

The sensor 904 in this embodiment of the present invention is configured to obtain the movement information of the terminal. The sensor 904 may be various sensor devices, for example, a hall element, and is configured to: sense a physical quantity of an electronic device, such as force, moment of force, pressure, stress, a location, displacement, a speed, acceleration, an angle, an angular velocity, a quantity of revolutions, a revolving speed, operating status change time, or the like, and convert the physical quantity into an electrical quantity for detection and control. Some other sensor devices may further include a gravity sensor, a tri-axis accelerometer, a gyroscope, and the like. In some optional implementations of the present invention, the sensor 904 may be integrated into the input unit 905.

The output unit 906 in this embodiment of the present invention is configured to output a text, an image, and/or video. The output unit 906 includes but is not limited to an image output unit and a sound output unit. The image output unit may include a display panel, such as a display panel configured in a form of a liquid crystal display (Liquid Crystal Display, LCD), an organic light-emitting diode (Organic Light-Emitting Diode, OLED), a field emission display (field emission display, FED), or the like. Alternatively, the image output unit may include a reflective display, such as an electrophoretic (electrophoretic) display, or a display using an interferometric modulation of light (Interferometric Modulation of Light) technology. The image output unit may include a single display or multiple displays in different sizes. In a specific implementation of the present invention, the touch panel used by the input unit 905 may also be used as the display panel of the output unit 906 simultaneously. For example, after detecting a touch or proximity gesture operation on the touch panel, the touch panel transmits the gesture operation to the processor 902 to determine a touch event type. Then, the processor 902 provides corresponding visual output on the display panel according to the touch event type. In FIG. 9, the input unit 905 and the output unit 906 are used as two independent components to implement input and output functions of the electronic device; however, in some embodiments, a touch panel and a display panel may be integrated to implement input and output functions of the terminal. For example, the image output unit may display various graphical user interfaces (Graphical User Interface, GUI) used as virtual control components, including but not limited to a window, a scroll bar, an icon, and a clipboard, so that the user performs an operation in a touch control manner.

In a specific implementation of the present invention, the image output unit includes a filter and an amplifier, configured to filter and amplify video output by the processing unit. The audio output unit includes a digital-to-analog converter, configured to convert an audio signal, output by the processor 901, from a digital format into an analog format.

The terminal in this embodiment of the present invention further includes a power unit 909, configured to supply power to different components of the terminal, so as to maintain running of the terminal. Generally, it is understood that the power unit 909 may be an internal battery such as a common lithium-ion battery or a common NiMH battery, or may include an external power supply that directly supplies power to the terminal, for example, an AC adapter. In some implementations of the present invention, the power unit 909 may further have a broader definition, for example, may further include a power management system, a charging system, a power failure detection circuit, a power converter or inverter, a power status indicator such as a light emitting diode, and any other component related to power generation, management, and distribution of the electronic device.

In conclusion, in this embodiment of the present invention, the terminal obtains all predicted locations of a current location, predicts, according to the historical movement information of the terminal, a first probability that the terminal passes through each predicted location at a next moment, receives a wireless signal sent by a positioning transmitter, obtains, based on strength of the received signal, a second probability that the terminal passes through each predicted location at the next moment, generates, according to the first probability and the second probability that are corresponding to each predicted location, a third probability corresponding to each predicted location, and determines a predicted location point with a highest third probability as a location of the terminal at the second moment. In this way, in a terminal positioning process, a positioning location of the terminal is predicted by comprehensively analyzing the historical movement information of the terminal and the strength of the wireless signal received by the terminal, instead of simply depending on the strength of the wireless signal received by the terminal. In the terminal positioning process, the historical movement information of the terminal is used to calculate an occurrence probability corresponding to a predicted location. Therefore, jump of the positioning location can be avoided, continuity of the positioning location of the terminal is ensured, user experience is improved, and positioning accuracy can be improved.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An indoor positioning method, comprising:
obtaining, by a terminal, a first location of the terminal at a first moment;
obtaining, by the terminal, a plurality of predicted locations corresponding to the first location;
for each predicted location of the plurality of predicted locations, obtaining, by the terminal according to historical movement information of the terminal, a first probability corresponding to the predicted location, wherein the first probability corresponding to the predicted location is a probability that the terminal is located at the predicted location at a second moment and the first probability is obtained according to the historical movement information of the terminal, and the second moment is later than the first moment;
obtaining, by the terminal, signal strength of at least one wireless signal received by the terminal at the second moment;
obtaining, by the terminal according to the signal strength of the at least one wireless signal, a second probability corresponding to the predicted location; wherein the second probability corresponding to the predicted location is a probability that the terminal is located at the predicted location at the second moment and the second probability is obtained according to the signal strength of the at least one wireless signal;
obtaining, by the terminal according to the first probability and the second probability that are corresponding to the predicted location, a third probability corresponding to the predicted location; and
determining, by the terminal, a predicted location with a highest third probability in the plurality of predicted locations as a second location of the terminal at the second moment.

2. The method according to claim 1, wherein the obtaining, by the terminal, a plurality of predicted locations corresponding to the first location comprises:
obtaining, by the terminal, a type of a geographical region in which the first location is located; and
obtaining, by the terminal according to the type of the geographical region in which the first location is located, the plurality of predicted locations corresponding to the first location.

3. The method according to claim 2, wherein the geographical region type comprises at least one of a unidirectional corridor, a bidirectional corridor, a unidirectional arc-shaped corridor, a bidirectional arc-shaped corridor, a plaza, or a connection region; wherein:
the unidirectional corridor is a rectilinear corridor allowing a pedestrian to walk in one direction;
the bidirectional corridor is a rectilinear corridor allowing a pedestrian to walk in both directions;
the unidirectional arc-shaped corridor is an arc-shaped corridor allowing a pedestrian to walk in one direction;
the bidirectional arc-shaped corridor is an arc-shaped corridor allowing a pedestrian to walk in both directions;
the plaza is a region in which a walking direction of a pedestrian is not restricted; and
the connection region is a region connecting at least two geographical regions.

4. The method according to claim 1, wherein the historical movement information of the terminal comprises at least one of the following:
a movement location of the terminal in a preset period previous to the first moment,
a movement speed of the terminal in the preset period previous to the first moment, or
a movement direction of the terminal in the preset period previous to the first moment.

5. The method according to claim 1, wherein the obtaining, by the terminal according to the first probability and the second probability that are corresponding to the predicted location, a third probability corresponding to the predicted location comprises:
performing, by the terminal, weighted summation on the first probability and the second probability that are corresponding to the predicted location, to obtain the third probability corresponding to the predicted location.

6. The method according to claim 1, wherein the obtaining, by the terminal according to the first probability and the second probability that are corresponding to the predicted location, a third probability corresponding to the predicted location comprises:
multiplying, by the terminal, the first probability and the second probability that are corresponding to the predicted location, to obtain the third probability corresponding to the predicted location.

7. A terminal, comprising:
a transceiver configured to send and receive a wireless signal;
a sensor, configured to obtain movement information of the terminal;
at least one processor; and
a non-transitory computer readable storage medium coupled to the at least one processor and storing computer-executable codes which, when executed, cause the terminal to:
obtain a first location of the terminal at a first moment;
obtain a plurality of predicted locations corresponding to the first location;
obtain, according to historical movement information of the terminal, a first probability corresponding to each predicted location of the plurality of predicted locations;
obtain signal strength of at least one wireless signal received by the communications device at a second moment;
obtain, according to the signal strength of the at least one wireless signal, a second probability corresponding to each predicted location of the plurality of predicted locations;
obtain, according to the first probability and the second probability that are corresponding to each predicted location, a third probability corresponding to each predicted location of the plurality of predicted locations; and
determine a predicted location with a highest third probability in the plurality of predicted locations as a second location of the terminal at the second moment; wherein:
the first probability corresponding to the predicted location is a probability that the terminal is located at the predicted location at a second moment and the first probability is obtained according to the historical movement information of the terminal, the second moment is later than the first moment, and a second probability corresponding to the predicted location is a probability that the terminal is located at the predicted location at the second moment and the second probability is obtained according to the signal strength of the at least one wireless signal.

8. The terminal according to claim 7, wherein the computer-executable codes cause the terminal to:
obtain a type of a geographical region in which the first location is located; and
obtain, according to the type of the geographical region in which the first location is located, the plurality of predicted locations corresponding to the first location.

9. The terminal according to claim 8, wherein the geographical region type comprises at least one of a unidirectional corridor, a bidirectional corridor, a unidirectional arc-shaped corridor, a bidirectional arc-shaped corridor, a plaza, or a connection region; wherein:
the unidirectional corridor is a rectilinear corridor allowing a pedestrian to walk in one direction;
the bidirectional corridor is a rectilinear corridor allowing a pedestrian to walk in both directions;
the unidirectional arc-shaped corridor is an arc-shaped corridor allowing a pedestrian to walk in one direction;
the bidirectional arc-shaped corridor is an arc-shaped corridor allowing a pedestrian to walk in both directions;
the plaza is a region in which a walking direction of a pedestrian is not restricted; and
the connection region is a region connecting at least two geographical regions.

10. The terminal according to claim 7, wherein the historical movement information of the terminal comprises at least one or more of the following:
a movement location of the terminal in a preset period previous to the first moment,
a movement speed of the terminal in the preset period previous to the first moment, or
a movement direction of the terminal in the preset period previous to the first moment.

11. The terminal according to claim 7, wherein the computer-executable codes cause the terminal to:
perform weighted summation on the first probability and the second probability that are corresponding to the predicted location, to obtain the third probability corresponding to the predicted location.

12. The method according to claim 1, wherein the obtaining, by the terminal, a plurality of predicted locations corresponding to the first location comprises:
obtaining, by the terminal, a type of a geographical region in which the first location is located and a historical movement speed of the terminal; and
obtaining, by the terminal according to the type of the geographical region in which the first location is located and the historical movement speed of the terminal, the plurality of predicted locations corresponding to the first location.

13. The method according to claim 12, wherein the geographical region type comprises at least one of a unidirectional corridor, a bidirectional corridor, a unidirectional arc-shaped corridor, a bidirectional arc-shaped corridor, a plaza, or a connection region; wherein
the unidirectional corridor is a rectilinear corridor allowing a pedestrian to walk in one direction;
the bidirectional corridor is a rectilinear corridor allowing a pedestrian to walk in both directions;
the unidirectional arc-shaped corridor is an arc-shaped corridor allowing a pedestrian to walk in one direction;
the bidirectional arc-shaped corridor is an arc-shaped corridor allowing a pedestrian to walk in both directions;
the plaza is a region in which a walking direction of a pedestrian is not restricted; and
the connection region is a region connecting at least two geographical regions.

14. The terminal according to claim 7, wherein the computer-executable codes cause the terminal to:
obtain a type of a geographical region in which the first location is located and a historical movement speed of the terminal; and
obtain, according to the type of the geographical region in which the first location is located and the historical movement speed of the terminal, the plurality of predicted locations corresponding to the first location.

15. The terminal according to claim 14, wherein the geographical region type comprises at least one of a unidirectional corridor, a bidirectional corridor, a unidirectional arc-shaped corridor, a bidirectional arc-shaped corridor, a plaza, or a connection region; wherein:
the unidirectional corridor is a rectilinear corridor allowing a pedestrian to walk in one direction;
the bidirectional corridor is a rectilinear corridor allowing a pedestrian to walk in both directions;
the unidirectional arc-shaped corridor is an arc-shaped corridor allowing a pedestrian to walk in one direction;
the bidirectional arc-shaped corridor is an arc-shaped corridor allowing a pedestrian to walk in both directions;
the plaza is a region in which a walking direction of a pedestrian is not restricted; and
the connection region is a region connecting at least two geographical regions.

16. The terminal according to claim 7, wherein the computer-executable codes cause the terminal to:
multiply the first probability and the second probability that are corresponding to the predicted location, to obtain the third probability corresponding to the predicted location.

17. A non-transitory computer readable storage medium, including instructions which cause a terminal to:
obtain a first location of the terminal at a first moment;
obtain a plurality of predicted locations corresponding to the first location;
obtain, according to historical movement information of the terminal, a first probability corresponding to each predicted location;
obtain signal strength of at least one wireless signal received by the terminal at a second moment;
obtain, according to the signal strength of the at least one wireless signal, a second probability corresponding to each predicted location;
obtain, according to the first probability and the second probability that are corresponding to each predicted location, a third probability corresponding to each predicted location; and
determine a predicted location with a highest third probability in the plurality of predicted locations as a second location of the terminal at the second moment; wherein
the first probability corresponding to the predicted location is a probability that the terminal is located at the predicted location at a second moment and the first probability is obtained according to the historical movement information of the terminal, the second moment is later than the first moment, and a second probability corresponding to the predicted location is a probability that the terminal is located at the predicted location at the second moment and the second probability is obtained according to the signal strength of the at least one wireless signal.

18. The non-transitory computer readable storage medium according to claim 17, wherein the instructions cause the terminal to:
- obtain a type of a geographical region in which the first location is located; and
- obtain, according to the type of the geographical region in which the first location is located, the plurality of predicted locations corresponding to the first location.

19. The non-transitory computer readable storage medium according to claim 18, wherein the geographical region type comprises at least one of a unidirectional corridor, a bidirectional corridor, a unidirectional arc-shaped corridor, a bidirectional arc-shaped corridor, a plaza, or a connection region; wherein:
- the unidirectional corridor is a rectilinear corridor allowing a pedestrian to walk in one direction;
- the bidirectional corridor is a rectilinear corridor allowing a pedestrian to walk in both directions;
- the unidirectional arc-shaped corridor is an arc-shaped corridor allowing a pedestrian to walk in one direction;
- the bidirectional arc-shaped corridor is an arc-shaped corridor allowing a pedestrian to walk in both directions;
- the plaza is a region in which a walking direction of a pedestrian is not restricted; and
- the connection region is a region connecting at least two geographical regions.

20. The non-transitory computer readable storage medium according to claim 17, wherein the instructions cause the terminal to:
- obtain a type of a geographical region in which the first location is located and a historical movement speed of the terminal; and
- obtain, according to the type of the geographical region in which the first location is located and the historical movement speed of the terminal, the plurality of predicted locations corresponding to the first location.

* * * * *